Dec. 22, 1942. T. C. SMITH ET AL 2,306,231
COUPLING APPARATUS FOR VEHICLES
Filed Sept. 25, 1941 3 Sheets-Sheet 1

INVENTORS
*T.C.Smith* and
*A.E.Freeman*
BY
*Jefferson Cholch*
ATTORNEY

Dec. 22, 1942.   T. C. SMITH ET AL   2,306,231
COUPLING APPARATUS FOR VEHICLES
Filed Sept. 25, 1941   3 Sheets-Sheet 2

INVENTORS
T. C. Smith and
A. E. Freeman
BY Jefferson Ehrlich
ATTORNEY

Patented Dec. 22, 1942

2,306,231

UNITED STATES PATENT OFFICE 2,306,231

COUPLING APPARATUS FOR VEHICLES

Temple Clifford Smith, Westfield, and Albert Edward Freeman, South Orange, N. J., assignors to American Telephone and Telegraph Company, a corporation of New York Application September 25, 1941, Serial No. 412,208

20 Claims. (Cl. 280—33.15)

This invention relates to cable laying apparatus. The cable laying apparatus of this invention includes arrangements for interconnecting and coupling the units of a cable plow train and includes also arrangements for controlling the movements of these units. The cable laying apparatus of this invention also relates to arrangements for loading and unloading cable reels on the plow train units.

Heretofore a truck or tractor-drawn machine or plow was provided with a coulter for the preliminary opening of the ground in front of a plowshare. The plowshare was usually adjusted to enter the ground and form a trench therein of a desired depth. A reel of cable or wire was carried by the plow or by a towing truck or trailer, and the cable or wire was fed from the reel through guide channels formed in the plowshare into the trench at a rate of speed equal to that at which the plow advanced. This arrangement was satisfactory for laying a single cable or wire in the trench formation.

Where it is necessary to bury two cables in the same trench, the above-described arrangement is unsuitable because of the difficulty of handling two separate reels on a single unit such as a trailer, with accompanying apparatus for replacing the empty reels by full reels whenever required. This might be accomplished by some form of trailer which might be of the endless tread type, or of the wheel type, capable of carrying two reels at a time and having facilities for loading and unloading them independently. But such a structure is too cumbersome, is not easily handled, and lacks the flexibility desired in such operations.

Accordingly, an arrangement has been devised for using two endless tread trailers, one behind the other. Two such trailers are useful for both the single cable and dual cable jobs and the arrangement is therefore more flexible. Moreover, two such trailers are more easily handled in practice than a larger trailer of the type referred to.

This application will describe arrangements for coupling one trailer to another when used in a cable plow train. The arrangements will be so devised that the two trailers may be coupled to each other even when they are out of alignment by a wide angle.

When it is necessary to replace the empty reels with full ones, the arrangement to be described may be manipulated so as to allow the rear trailer to drop behind the rest of the plow train. Then the empty reel may be removed from the forward trailer and a full reel substituted therefor. With this operation completed, the rear trailer of the train is then returned to its former position immediately behind the rest of the train, the reel on the rear trailer changed and then the train may move on to continue its dual cable lying functions.

This invention will be better understood from the detailed description hereinafter following when read in connection with the accompanying drawings in which.

Throughout the drawings like reference characters will be employed to designate like parts.

Figure 1:
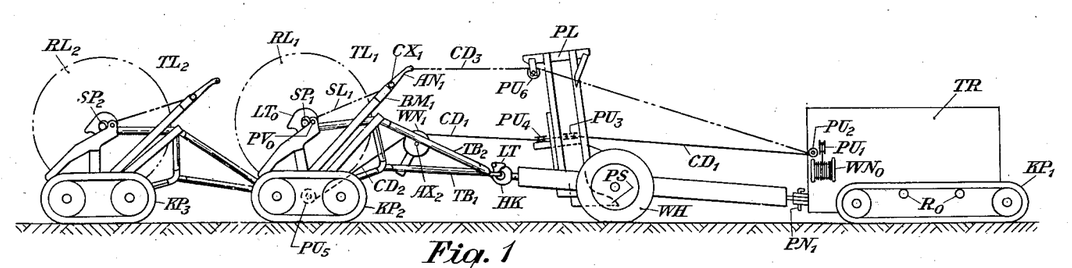
Figure 1 illustrates a side view of the cable plow train with its two trailers.
Figure 2:
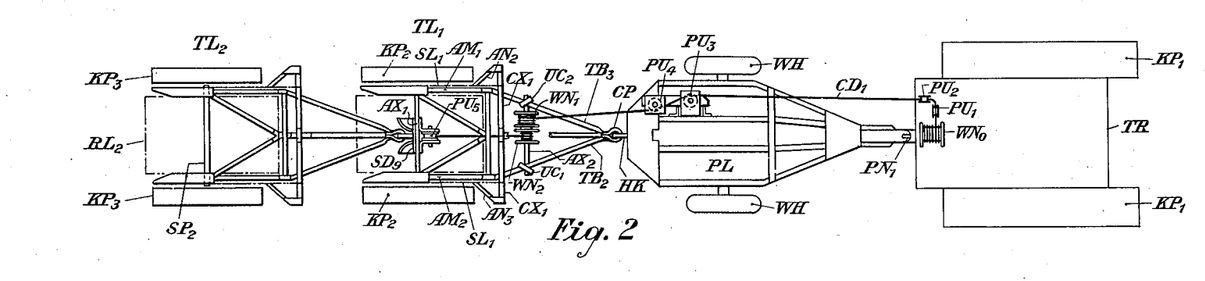
Fig. 2 shows a plan view of the arrangement of Fig. 1.
Figure 3:
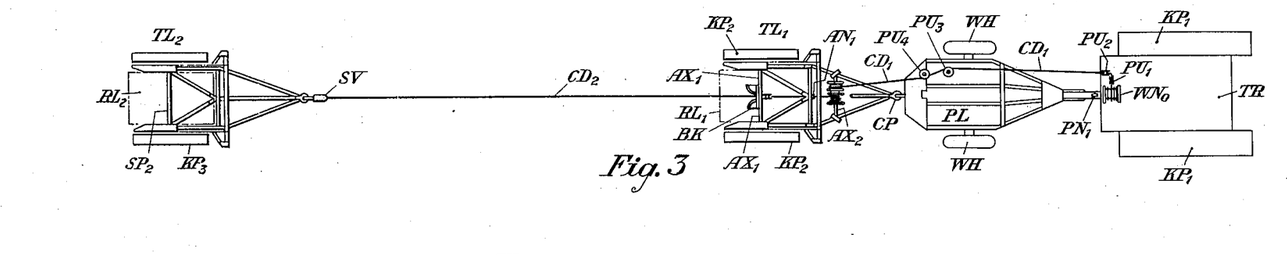
Fig. 3 shows the rear trailer dropped behind the forward trailer for re-loading operations.

Referring especially to Figs. 1 to 3 of the drawings, the general assembly of the cable plow train is shown, this assembly comprising a tractor TR, a plow PL, a first trailer $TL_1$ and a second or rear trailer $TL_2$. The tractor TR includes, among other things, a motor (not shown) for supplying power to move the train in a forward (or backward) direction and a pair of endless chains or tracks $KP_1$ of well known type to which the motor power is applied so that the train may advance. The rollers $R_0$ are employed to reduce the sag of endless chains or tracks $KP_1$. The plow PL may be mounted on wheel WH and it is coupled to tractor TR by a pin $PN_1$ in a well-known manner. The plow PL includes, among other things, a plowshare PS which is shown in its non-operating position and may be lowered to a desired level for trench forming operations. The first trailed $TL_1$ is mounted on endless chains or tracks $KP_2$ and includes, among other things, a cable reel $RL_1$ mounted on a spindle $SP_1$. The rear trailer $TL_2$ is also mounted on endless chains or tracks $KP_3$ and also includes a cable reel $RL_2$ mounted on a spindle $SP_2$. In Fig. 3, the rear trailer $TL_2$ is shown dropped behind the forward trailer $TL_1$ so that the empty reels may be replaced with full reels as required from time to time.

The tractor TR supports a winch $WN_0$ which may be operated by power obtained from the motor (not shown). A cord or rope $CD_1$, preferably of steel wire, is wrapped about the power winch $WN_0$. The cord $CD_1$ is guided over pulleys $PU_1$ and $PU_2$ supported on the tractor TR, the cord $CD_1$ being then guided over pulleys $PU_3$ and $PU_4$ which are supported on the plow unit PL. The cord $CD_1$ then extends to a winch drum $WN_1$ which is supported by a shaft or axle $AX_2$ on the first trailer $TL_1$, upon which shaft another winch drum $WN_2$ is mounted. The winch drum $WN_2$ has a similar cord $CD_2$ wrapped thereon, the cord $CD_2$ being guided over a pulley $PU_5$ to a bullet-nosed member SV which is attached to the rear trailer $TL_2$. As will be described more fully hereinafter, the cord $CD_1$ is unwrapped from winch $WN_0$, guided over pulleys $PU_1$, $PU_2$, $PU_3$ and $PU_4$ and "payed on" to winch drum $WN_1$ whenever the rear trailer $TL_2$ is to be dropped back for re-loading operations. Then cord $CD_2$ is "payed off" by winch drum $WN_2$ to allow the rear trailer $TL_2$ to be separated sufficiently from the forward trailer $TL_1$, thereby allowing re-loading of trailer $TL_1$. After the re-loading operation is completed, the winch $WN_0$ is driven in the direction to cause winch drum $WN_1$ to "pay back" cord $CD_1$ to winch $WN_0$ and at the same time compel winch drum $WN_2$ to receive the part of cord $CD_2$ previously "payed off," whereby the trailer $TL_2$ will be returned to its former position immediately behind trailer $TL_1$.

The two trailers $TL_1$ and $TL_2$ include apparatus for loading and unloading cable reels. In trailer $TL_1$, for example, the reel $RL_1$ is mounted on its spindle $SP_1$ which is connected by means of a sling $SL_1$ to a boom $BM_1$ as shown in Figs. 1–3. The boom $BM_1$ includes two arms $AM_1$ and $AM_2$ which are connected to each other by a crossbar $CX_1$, as shown in Figs. 1 and 2. The boom $BM_1$ has a protruding arm $AN_1$ to which a cord $CD_3$ is connected. This cord is used only for re-loading operations. The cord $CD_3$ extends over a pulley $PU_6$ mounted on the plow device PL to a drum (not shown) on winch $WN_0$ positioned on the tractor TR. The members $AN_2$ and $AN_3$ couple the arms $AM_1$ and $AM_2$, respectively, to the crossbar $CX_1$ and thereby reinforce the boom.

To unload the reel $RL_1$, the latch $LT_0$, pivoted at $PV_0$, is opened and then the cord $CD_3$ is released by operating the winch drum (not shown) on the tractor TR, thereby permitting the reel $RL_1$ to leave the trailer $TL_1$. The spindle $SP_1$, weighted by the reel $RL_1$, draws the sling $SL_1$ with it, causing the boom $BM_1$ to rotate counter-clockwise about its axis (not shown). When a full reel is thereafter placed on spindle $SP_1$, the winch above referred to is revolved in the opposite direction, thereby pulling the cord $CD_3$ to the right and also rotating boom $BM_1$ in a clockwise direction. This action of boom $BM_1$ at the same time pulls the sling $SL_1$ with it and causes the reel $RL_1$ to be moved into its proper position in trailer $TL_1$. Although the reel re-loading operations have been described in connection with trailer $TL_1$, the same operations are required to re-load trailer $TL_2$ and hence no further description of this action is necessary.

Figures 4, 5:
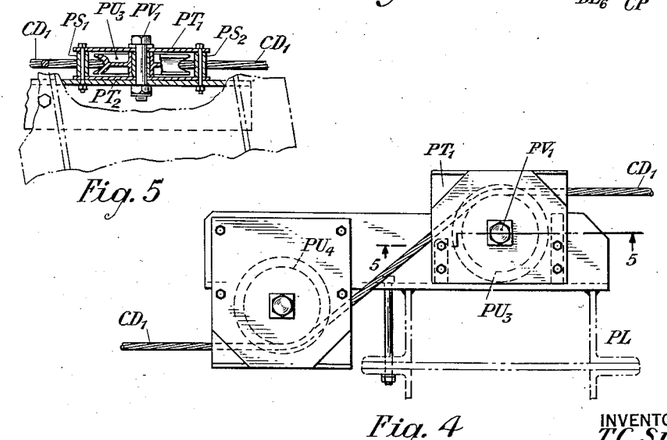
Fig. 4 shows the pulley assembly mounted on the plow device.
Fig. 5 represents a cross-sectional view of the pulley arrangement of Fig. 4 taken along the line 5—5.

The cord $CD_1$, which passes from winch $WN_0$ and over pulleys $PU_1$ and $PU_2$ mounted on the tractor TR then passes over similar pulleys $PU_3$ and $PU_4$ mounted on the plow device PL to the winch drum $WN_1$. The pulley arrangement last referred to is shown in Fig. 4. Fig. 5 shows a cross-sectional view of the $PU_3$ pulley structure. The pulley $PU_3$ is rotatably mounted on the bolt pivot $PV_1$. The pulley $PU_3$ is supported between two plates $PT_1$ and $PT_2$ which are separated by hollow cylindrical spacers $PS_1$ and $PS_2$.

The cord $CD_2$, which is controlled by winch drum $WN_2$, passes over pulley $PU_5$ on the forward trailer $TL_1$ to a bullet-shaped member SV which is connected to the rear trailer $TL_2$, as already stated. The bullet-shaped coupling apparatus is shown in detail in Figs. 6, 7 and 8.

Figure 6:
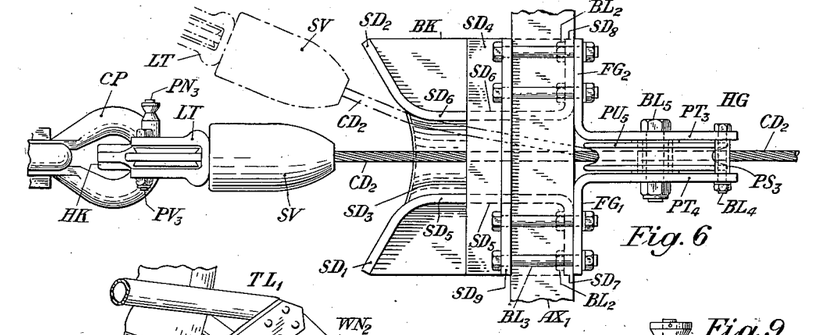
Fig. 6 shows a plan view of the elements for coupling two reel carrying trailers together, the accompanying trailers being disengaged.
Figures 7, 11, 12, 13:
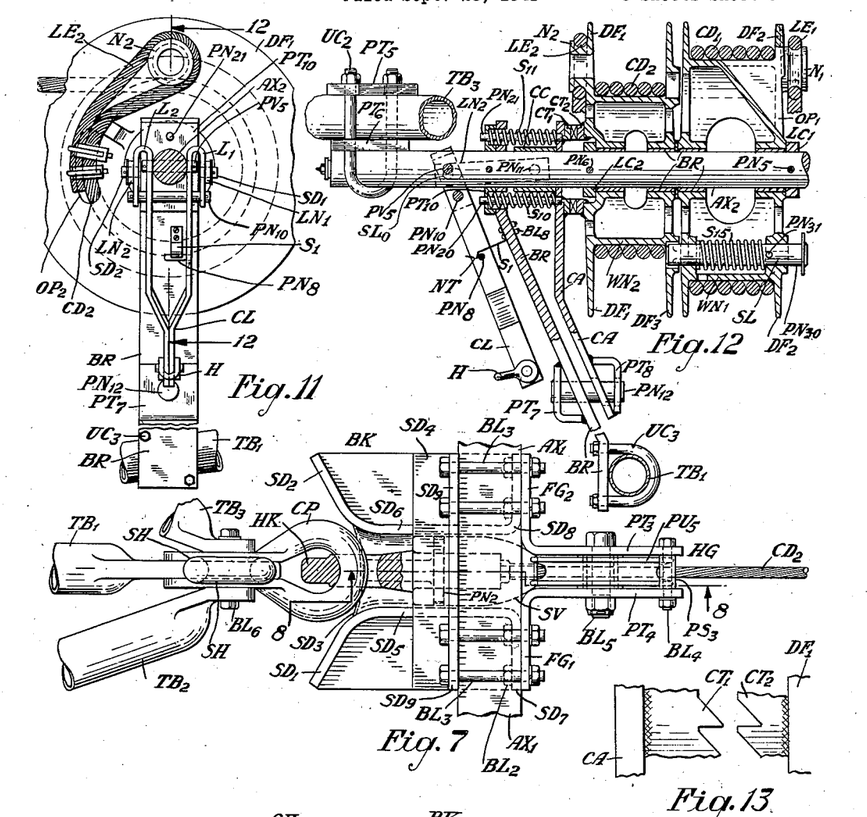
Fig. 7 illustrates the coupling elements of Fig. 6 in their fully engaged positions, Fig. 8 exhibits a sectional view of the coupling apparatus taken along the line 8—8 of Fig. 7.
Fig. 11 shows a side view of the latter winch assembly, together with its control mechanism.
Fig. 12 is a cross-sectional view of the dual or relay winch assembly taken along the line 12—12 of Fig. 11.
Fig. 13 illustrates part of the toothed clutch mechanism for controlling the operation of the dual winch apparatus just referred to, the toothed mechanism being shown in its disengaged position.
Figure 8:
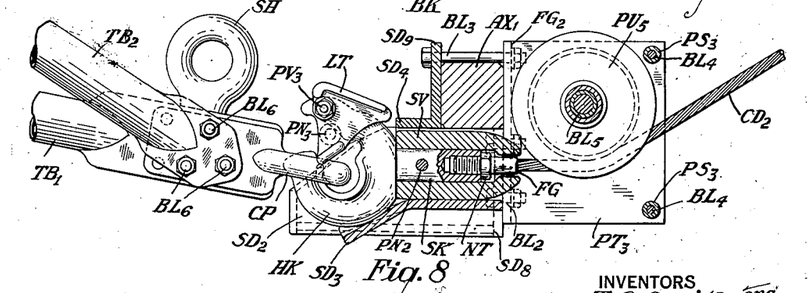

The cord $CD_2$ passes through the opening of a bracket BK as shown, for example, in Fig. 6. The bracket BK comprises two equal side members $SD_1$ and $SD_2$ and lower and upper members $SD_3$ and $SD_4$, respectively. The side members $SD_1$ and $SD_2$ are curved, flaring outwardly to the left as shown in Figs. 6 and 7. This curvature permits the bullet-shaped member SV to enter the opening of bracket BK at any angle within wide limits as is illustrated by Fig. 6.

The curvature of the two side members $SD_1$ and $SD_2$ of the bracket BK is reduced the greater the departure from the left-hand side or beginning of the bracket opening. The members $SD_5$ and $SD_6$ are contiguous with the side members $SD_1$ and $SD_2$, respectively, and are parallel to each other as shown in Figs. 6 and 7. Members $SD_5$ and $SD_6$ are spaced apart sufficiently to allow the bullet-shaped member SV to rest therein when fully inserted. The members $SD_5$ and $SD_6$ are also contiguous with members $SD_7$ and $SD_8$, respectively. The latter members are respectively flush with and are connected to the flanges $FG_1$ and $FG_2$ which form part of a housing or bracket HG for pulley $PU_5$, the connection being established by bolts and nuts $BL_2$.

The upper member $SD_4$ of bracket BK is actually an angular-shaped member including also a vertical member $SD_9$. The vertical member $SD_9$ provides a means for connecting the bracket BK to the axle $AX_1$ and to the flanges $FG_1$ and $FG_2$ of the housing HG of the pulley $PU_5$, the connection being established by bolts and nuts $BL_3$. Thus there is provided on the first trailer $TL_1$ a permanent bracket BK having an opening so shaped as to receive the movable bullet-shaped member SV when arriving over any angle within a wide range, the member SV being rotatable within said opening of the bracket BK.

The housing or bracket HG for pulley $PU_5$ includes two parallel plates $PT_3$ and $PT_4$ which are spaced by tubular spacers $PS_3$ through which bolt and nut members $BL_4$ pass to fasten the plates $PT_3$ and $PT_4$ together. The pulley $PU_5$ is provided with a bolt and nut member $BL_5$ which acts as a pivot and allows the pulley to rotate freely thereabout.

The bullet-shaped member SV has a central longitudinal opening, extending along its length and having an aperture at its extreme right. The cord $CD_2$ terminates within this aperture. A cylindrical fitting FG is frozen, welded, soldered or otherwise fastened to the cord $CD_2$. This fitting is threaded externally so as to receive a nut NT for locking purposes.

The central opening in the bullet-shaped device SV also receives the shank SK of a hook HK. A pin $PN_2$ inserted in transverse holes within shank SK and device SV is employed to maintain the shank SK connected to the device SV at all times. The shank SK has an aperture which is internally threaded so as to engage the externally threaded fitting FG. The nut NT locks the fitting FG against shank SK and at the same time holds the cord $CD_2$ to prevent its disconnection from the bullet-shaped element SV. Hence the cord $CD_2$ may move back and forth through the bracket BK, guided by pulley $PU_5$, but the end of cord $CD_2$ remains permanently affixed to the bullet-shaped member SV.

The hook HK is shown in engagement with the circular opening of a coupling eye member CP which forms part of the rear trailer $TL_2$ structure. The hook HK and the coupling eye member CP may be locked in operative relation to each other by means of a triangular-shaped latch device LT. The latch device LT is shown especially in Fig. 8. This latch device is rotatable about a pivot $PV_3$ which is mounted in a hole near the tip of hook HK.

Figures 9, 10:
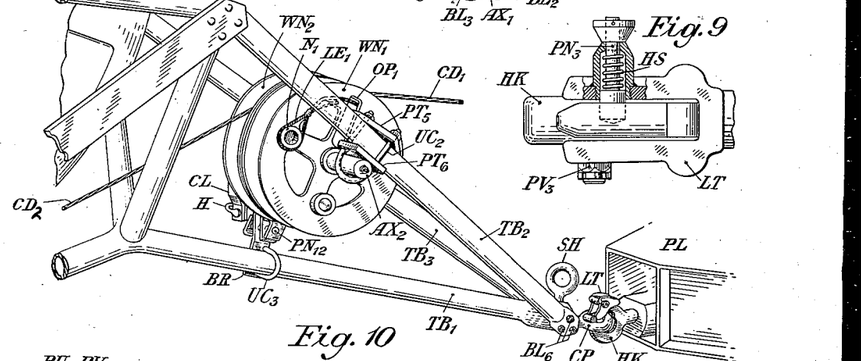
Fig. 9 shows a locking device, partly in section, for the coupling apparatus of Figs. 6–8.
Fig. 10 illustrates a perspective of the general assembly of a relay winch supported on the forward trailer.

As shown in Fig. 9, the latch device LT carries a pin or plunger $PN_3$ the movement of which occurs within an opening in device LT. A helical spring HS is employed to keep the pin or plunger $PN_3$ normally depressed. To unlock the latch LT the operator will withdraw the pin or plunger $PN_3$ from latch LT against the retarding influence of spring HS and then the hook HK and eye member CP may be uncoupled. When the latter elements are later re-coupled to each other, the plunger $PN_3$ will be manipulated to lock the latch device LT to keep these elements in coupled relation.

It will be observed that when the bullet-shaped device SV is fully inserted within the opening of bracket BK, the hook HK is brought to rest against the lower member $SD_3$ of bracket BK and there held immovably fore and aft. The coupling eye CP may be swung about the hook HK as the two trailers $TL_1$ and $TL_2$ change the angle between them, but latch LT will maintain the trailers closely coupled although their angular displacement changes from time to time.

The coupling eye member CP is fastened by means of three bolt and nut members $BL_6$ to three hollow tubular struts $TB_1$, $TB_2$ and $TB_3$ and to a safety eye member SH. The struts $TB_1$, $TB_2$ and $TB_3$ are part of the $TL_1$ trailer structure employed for supporting the winches $WN_1$ and $WN_2$ (see Fig. 10). The safety eye member SH may receive a rope (not shown) connecting it to the frame of plow PL. This rope will maintain plow PL and trailer $TL_1$ connected to each other in the event that the hook and eye coupling CP—HK should become disengaged accidentally.

The winch drums $WN_1$ and $WN_2$ are lined with bearings BR as shown, for example, in Fig. 12, in order that the winch drums may be rotatable about the non-rotatable shaft or axle $AX_2$. The axle $AX_2$ is supported by the tubular strut members $TB_2$ and $TB_3$ on the front trailer as shown, for example, in Fig. 10. The support for the axle $AX_2$ is provided by U-shaped clamping members which comprise U-shaped bolts $UC_1$ and $UC_2$ which fasten the axle $AX_2$ to the struts $TB_2$ and $TB_3$ by means of plates $PT_5$ and $PT_6$ and nuts which mesh with the threads on the U-bolts, thereby holding the assembly tightly in place. The general arrangement of the two winch drums forming a relay and the various tubular members $TB_1$, $TB_2$ and $TB_3$ are shown in Fig. 10, as already indicated hereinabove.

The winch drums $WN_1$ and $WN_2$, though rotatable about the axle $AX_2$, are prevented from moving sidewise along the axle $AX_2$ by means of collars $LC_1$ and $LC_2$. The collar $LC_1$ fits around the axle $AX_2$ and is adjacent to the bearing BR of the winch drum $WN_1$. The like collar $LC_2$ is adjacent to the bearing BR of the other winch drum $WN_2$. The collar $LC_1$ is permanently affixed to the axle $AX_2$ by means of a pin $PN_5$. The collar $LC_2$ is likewise affixed to the axle $AX_2$ by a pin $PN_6$. The collars $LC_1$ and $LC_2$ therefore, prevent any lateral displacement of the winch drums $WN_1$ and $WN_2$ along the axle $AX_2$ as already noted.

A clutch lever CL is pivoted to the axle $AX_2$ at the pin $PV_5$ which is permanently mounted in the axle $AX_2$. Spaced from the clutch lever CL is a brace BR which is fastened to the tubular strut $TB_1$ by a U-bolt arrangement $UC_3$ as shown, for example, in Figs. 10 and 12. A flat spring $S_1$ is supported by the brace BR by means of bolt members $BL_8$, this flat spring having a notch NT which may engage a pin $PN_8$ carried by the clutch lever CL. The notch NT of the spring $S_1$ will retain the clutch lever CL in place when the clutch lever is in the position shown in Fig. 12. By pulling on the shackle H as, for example, by means of a rope or manually, the clutch lever CL may be rotated about its pivot $PV_5$ to overcome the retarding influence of the notch NT of the spring $S_1$. Thus, by pulling on the shackle H the lever CL may be swung about the pivot $PV_5$ in a clockwise direction, as viewed in Fig. 12.

The clutch lever CL is fork-shaped as shown in Fig. 11, and its ends are turned back at sections $L_1$ and $L_2$. A pin $PN_{10}$ extends through the various sections of the clutch lever CL, this pin limiting the angle through which the clutch lever CL may rotate when shackle H is pulled. The clockwise angular rotation is determined by the point at which the pin $PN_{10}$ strikes the axle $AX_2$.

The sections $L_1$ and $L_2$ of the Y-shaped clutch lever CL carry studs $SD_1$ and $SD_2$ which are welded to the clutch lever. These studs support two rectangular-shaped, elongated links $LN_1$ and $LN_2$, which are held on the studs $SD_1$ and $SD_2$ by means of cotter pins, the holes for which are shown in Fig. 11. The links $LN_1$ and $LN_2$ are connected to a clutch collar CC by means of a pin $PN_{11}$, only one of which is shown in Fig. 12. The clutch collar CC is welded to the clutch arm CA. Thus, links $LN_1$ and $LN_2$ provide means for interconnecting the clutch lever CL with the clutch arm CA in order that the movements imparted to the clutch lever CL may be communicated to the clutch arm CA.

The clutch arm CA has an upper opening through which the axle $AX_2$ passes, and another opening at its lower end through which a pin $PN_{12}$ passes. The clutch arm CA may be directly coupled to the drum face $DF_1$ of the winch drum $WN_2$ by means of clutch teeth $CT_1$ and $CT_2$ which are of the ratchet type as shown in larger scale in Fig. 13. The pin $PN_{12}$ is welded or otherwise permanently affixed to the brace BR and it is reinforced against the member BR by means of a plate $PT_7$. The other end of the pin $PN_{12}$ may slide through the lower opening in the clutch arm CA and through a corresponding opening in another plate $PT_8$ which is welded to the clutch arm CA. The pin $PN_{12}$ thus allows the clutch arm CA to be spaced from the bracket BR by various distances while maintaining the relative angular positions of both of these members unchanged at all times. Hence it will be noted that when the clutch lever CL is rotated in one direction or the other about its pivot $PV_5$, the clutch teeth $CT_1$ and $CT_2$ will be engaged or disengaged.

Rods $PN_{20}$ and $PN_{21}$ are mounted permanently in the clutch arm CA, as shown, for example, in Fig. 12. These rods are positioned within coil springs $S_{10}$ and $S_{11}$, respectively, these springs being held between the clutch arm CA and an end plate $PT_{10}$. The end plate $PT_{10}$ has openings at its left end (when viewed in Fig. 12) so that the ends of the rods $PN_{20}$ and $PN_{21}$ may slide therethrough. The end plate $PT_{10}$ is provided with shoulders for the springs $S_{10}$ and $S_{11}$ so that as the clutch arm CA is moved back and forth, the rods $PN_{20}$ and $PN_{21}$ will be carried with the arm CA against the retarding influence of the springs $S_{10}$ and $S_{11}$. The latter springs apply pressure which acts to return the clutch arm CA to its normal position in which it maintains the clutch teeth $CT_1$ and $CT_2$ in engagement.

When the shackle H is caused to move to the left (when looking at Fig. 12), the clutch arm CL swings clockwise about its pivot $PV_5$, as already stated, thereby carrying the links $LN_1$ and $LN_2$ therewith. This movement of the links $LN_1$ and $LN_2$ advances the clutch collar CC in the same direction, i. e., to the left, and thereby causes the clutch arm CA to be shifted to the left through a corresponding distance. This movement of the clutch arm CA will release the clutch mechanism by separating the two sets of teeth $CT_1$ and $CT_2$ from each other. With the disengagement of the clutch the winch drums $WN_1$ and $WN_2$ may then freely rotate about the axle $AX_2$. When the shackle H is returned to its normal position in which the notch NT of the spring $S_1$ engages the pin $PN_3$, the links $LN_1$ and $LN_2$ will be returned to their former positions, i. e., to the right, thereby restoring the clutch arm CA to its normal position as shown in Fig. 12. The clutch teeth $CT_1$ and $CT_2$ will then be re-engaged, the springs $S_{10}$ and $S_{11}$ acting to hold the clutch teeth in engaged position. Under these conditions the winch drums $WN_1$ and $WN_2$ are able to rotate about the axle $AX_2$ in but one direction due to the ratchet action of the clutch teeth. It will be observed that the clutch lever pivot $PV_5$ is positioned within a slot $SL_0$ to enable the clutch ratchet action to take place.

The winch drum $WN_1$ has a protruding nob $N_1$ about which may be wrapped a loop $LE_1$ formed at the end of the cord $CD_1$. The cord $CD_1$ enters an opening $OP_1$ in the outer face $DF_2$ of the drum $WN_1$, and the cord $CD_1$ may then be wound about this drum. Likewise the winch drum $WN_2$ has a protruding knob $N_2$ about which is wrapped a loop $LE_2$ formed at one end of the cord $CD_2$, this cord being wound about the drum $WN_2$. This cord $CD_2$ reaches the drum through an opening $OP_2$ in the drum face $DF_1$.

To maintain the winch drums $WN_1$ and $WN_2$ in coupled relationship a pin or plunger $PN_{30}$ is provided, this pin or plunger being inserted through the drum $WN_1$ to enter an opening or depression in the drum face $DF_3$ of the winch drum $WN_2$. The pin or plunger $PN_{30}$ is held in position by means of a helical spring $S_{15}$ mounted within the opening in the winch drum $WN_1$.

To uncouple the winch drums $WN_1$ and $WN_2$ from each other, the operator will withdraw the plunger $PN_{30}$ sufficiently against the retarding effect of the spring $S_{15}$, so that the pin $PN_{31}$ carried by the plunger $PN_{20}$ may clear the drum face $DF_3$. In other words, the plunger $PN_{30}$ is lifted out of its opening in the drum face $DF_3$ by sliding the pin $PN_{31}$ along its groove SL until the pin $PN_{31}$ is clear of the boss on the drum face $DF_3$. The plunger $PN_{30}$ is then rotated through a small angle so that the boss of the drum face will prevent the return of the pin $PN_{31}$ into its slot SL. When the plunger is so released, the two winch drums are then uncoupled from each other and may be rotated independently. By returning the pin $PN_{31}$ to its slot SL the plunger $PN_{30}$ will be carried by the spring $S_{15}$ back into its normal position, thereby re-coupling the two winch drums to each other.

The general operating features are as follows: The devices $WN_1$ and $WN_2$ provide a relay winch which is used for the control of the rear trailer $TL_2$. In this double drum relay winch one of the winch drums $WN_1$ is turned by the pull of a steel rope $CD_1$ fed back from the power winch $WN_0$ on the rear of the caterpillar tractor TR. The other winch drum $WN_2$ handles a steel rope $CD_2$ leading down and back to the bullet-nose-coupling device SV under the axle $AX_1$ of the front trailer $TL_1$. When it is desired to disconnect the rear trailer $TL_2$ from the train, as mentioned hereinabove, in order to permit changing of the reel $RL_1$ on the front trailer $TL_1$, the locking apparatus on the relay winch is released by pulling on the shackle H by means of a rope or manually. This releases the clutch teeth $CT_1$—$CT_2$. When this happens the rear trailer $TL_2$ comes to a halt, and as the tractor TR advances further the rope $CD_2$ will be withdrawn from one of the winch drums $WN_2$, while at the same time the other winch drum $WN_1$ will wind steel rope thereon as it is released from the tractor power winch $WN_0$. Since the bullet-nose-coupling device SV may be held in its bracket housing BK only by pulling on the rope $CD_2$, the rear trailer $TL_2$ will halt immediately after the shackle H is pulled by the operator to release the locking mechanism for the relay winch.

After the reel change has been made on the front trailer $TL_1$ the power winch $WN_0$ is operated so as to pull the line $CD_1$ leading to the winch drum $WN_1$. The rotation of the winch drum $WN_1$ in turn revolves the winch drum $WN_2$, thereby taking up on the rope $CD_2$ until the bullet-nose device SV is drawn forward sufficiently. By pulling in a sufficient length of the cord $CD_2$, the rear trailer $TL_2$ will be moved through the medium of the towing hook HK until the bullet-nose device SV is positioned and secured within the bracket housing BK. The cord $CD_2$ is then held taut by the release of the shackle H which permits springs $S_{10}$ and $S_{11}$ to re-engage the clutch mechanism and thereby prevent the relay winch from further operating except in but one direction.

As seen, for example, in Fig. 12, the spring-actuated plunger $PN_{30}$ couples the two winch drums $WN_1$ and $WN_2$ together. The release of this spring-actuated pin $PN_{30}$ permits the drums $WN_1$ and $WN_2$ to operate independently whenever this is desired. This is important in cable plowing operations because it is sometimes necessary to either wind or unwind the power winch line $CD_1$ from one drum of the relay winch at a time when the other drum cannot be moved, due to the position of the rear trailer TL₂ and the coupler element SV.

Another feature of the arrangement above described lies in the locking mechanism for the relay winch. This locking mechanism is spring-actuated, thereby normally preventing the relay winch from operating to release the rear trailer. The clutch teeth CT₁ and CT₂ are developed in such a manner that the relay winch can be turned only in the take-up direction as already noted, with the spring ratchet holding at all times as the drum is turned for the take-up action.

Another important feature is provided by the bullet-nose-coupling arrangement above set forth. This permits a complete swivel action for the coupling mechanism at all times. The trailers TL₁ and TL₂ may, therefore, be coupled even when they are out of alignment by a wide angle. This is a necessary element in cable plowing operations of the type above described.

By affixing one end of rope CD₂ to the bullet-shaped member SV, the member SV may be brought into position within the opening of bracket BK and held there, although the member SV may swing or revolve about its longitudinal axis while retained by rope CD₂. The member SV may thus rotate about its axis while prevented from moving in a longitudinal direction. This is another important element in vehicular plow train operations.

While the invention has been shown and described in certain particular embodiments merely for the purpose of illustration, it will be understood that the general principles of this invention may be applied to other and widely varied organizations without departing from the spirit of the invention and the scope of the appended claims.

What is claimed is:

1. The combination of two winch drums mounted adjacent to each other on a common non-rotatable shaft, means for mechanically coupling said winch drums to each other so that both may rotate together about said shaft in either direction, spring-actuated locking mechanism mounted upon the same shaft for preventing the rotation of said winch drums except in one direction, and means for releasing said locking mechanism to allow said winch drums to rotate in either direction about said shaft.

2. The combination of two winch drums mounted adjacent to each other about a common non-rotatable shaft, said drums being normally coupled to each other so that both may rotate together about said shaft in either direction, spring-actuated locking mechanism mounted upon said shaft and coupled to one of said drums to enable said latter drum to rotate in only one direction, means for releasing said locking mechanism to enable both drums to rotate in either direction, and means to uncouple said drums to enable them to rotate freely and independently of each other.

3. The combination of first and second winch drums mounted adjacent to each other about a common non-rotatable shaft, spring-actuated locking mechanism mounted on said shaft and coupled to said first drum to normally permit said drum to rotate in but one direction, a coupling for connecting said first drum to said second drum so that both drums may rotate together, means for releasing said locking mechanism to enable said first drum to freely rotate in either direction, and means for uncoupling said first drum from said second drum so that both drums may freely rotate in either direction independently of each other.

4. The combination of two winch drums which are positioned adjacent to each other on a common non-rotatable shaft, spring-actuated locking mechanism concentrically mounted upon said shaft and normally coupled to one of said winch drums, said locking mechanism including toothed members which when engaged allow said latter winch drum to which they are coupled to rotate in but one direction, means for coupling the two winch drums to each other so that they both rotate together whenever desired, and means for releasing said locking mechanism so that the winch drum to which said locking mechanism is coupled may rotate in either direction about said shaft.

5. A train including a first and a second vehicle, apparatus for coupling first and second vehicles to each other including a bullet-shaped member affixed to the second vehicle, a housing having an opening for receiving said bullet-shaped member, first and second winch drums mechanically coupled to each other so as to be rotatable about a common non-rotatable shaft, said winch drums and said housing being mounted on said first vehicle, the first winch drum having a first rope wound thereon, said first rope passing through the opening of said housing, and one end of said first rope being affixed to said bullet-shaped member, a second rope wound about the second winch drum, spring-actuated locking mechanism coupled to said winch drums to normally allow their rotation in one direction about their common shaft, means for releasing said locking mechanism so that said winch drums may rotate in either direction about their common shaft, means for pulling up on said second rope so as to closely couple said bullet-shaped member to said housing, and means to release the clutch mechanism to allow said bullet-shaped member to be uncoupled from said housing.

6. The combination of two drums on which are wound separate ropes, an immovable shaft about which both drums may rotate, means for coupling the two drums to each other so that they may rotate about said shaft in unison, a pair of toothed members which are also mounted on said shaft, one of said toothed members being attached to one of said drums, spring-actuated means for maintaining said toothed members in engagement with each other to enable said drums to normally rotate in but one direction, and means for releasing the toothed members from each other in order to allow said drums to rotate freely in either direction.

7. The combination of two drums mounted on a common immovable shaft, first and second circular toothed plates which are mounted on the same shaft, the first plate being affixed to the face of one of said drums and said second plate being non-rotatable about said shaft, a stationary member, spring-actuated means interposed between said second plate and said stationary member to maintain said toothed members in engagement, said drums being mechanically coupled to each other to rotate in unison, the teeth of said toothed members being so shaped as to permit said drums to rotate in but one direction when said toothed members are in engagement, and means for separating the second toothed member from the first toothed member against the pressure of said spring-actuated means in order to enable said drums to rotate in either direction.

8. A train including a first and a second vehicle, apparatus for coupling a first vehicle to a second vehicle including, in combination, a bracket having an opening, said bracket being mounted on the first vehicle, two winch drums mechanically coupled to each other and rotatable about a common immovable shaft which is mounted on said first vehicle, said second vehicle having an element which may be inserted into the opening of said bracket, locking mechanism associated with said winch drums, means including said locking mechanism to prevent the rotation of said winch drums about their common shaft except in one direction, separate ropes wound about said winch drums, the end of one of said ropes passing through the opening of said bracket and being affixed to said element of said second vehicle, and means for releasing said locking mechanism to permit said winch drums to rotate in either direction about their common shaft.

9. A train including a tractor and at least one trailer arranged to be coupled thereto, a driving winch on said tractor, a relay-winch having drums of different diameters, said drums being normally coupled to rotate together, a first cable attached to said trailer and arranged to be wound upon a first one of said drums, and a second cable adapted to be wound upon said driving winch and upon a second relay-winch drum of a different diameter, whereby when the driving winch is released and the trailer is uncoupled said first cable will be unwound from said first drum as the tractor moves forward, thereby causing said second cable to be unwound from said driving winch and wound upon said second drum so as to permit the trailer to stand still while the tractor advances.

10. A train including a tractor and at least one trailer arranged to be coupled thereto, a driving winch on said tractor, a relay-winch having drums of different diameters, said drums being normally coupled to rotate together, a first cable attached to said trailer and arranged to be wound upon a first one of said drums, and a second cable adapted to be wound upon said driving winch and upon a second relay-winch drum of a different diameter, whereby when the driving winch is released and the trailer is uncoupled said first cable will be unwound from said first drum as the tractor moves forward, thereby causing said second cable to be unwound from said driving winch and wound upon said second drum so as to permit the trailer to stand still while the tractor advances, and whereby when power is applied to the driving winch it will wind upon itself cable unwound from said second drum, said unwinding operation causing said first drum to rotate and wind up the cable attached to said trailer so as to draw the trailer toward the tractor, the difference in the diameters of said drums causing a change in the amount of power applied to draw up said trailer as compared with the power applied to said driving winch.

11. A train including a tractor and at least one trailer arranged to be coupled thereto, a driving winch on said tractor, a relay-winch having drums of different diameters, said drums being normally coupled to rotate together, a first cable attached to said trailer and arranged to be wound upon a first one of said drums of smaller diameter, and a second cable adapted to be wound upon said driving winch and upon a second relay-winch drum of larger diameter, whereby when the driving winch is released and the trailer is uncoupled said first cable will be unwound from said smaller drum as the tractor moves forward, thereby causing said second cable to be unwound from said driving winch and wound upon said larger drum so as to permit the trailer to stand still while the tractor advances, and whereby when power is applied to the driving winch it will wind upon itself cable unwound from said larger drum, said unwinding operation causing said smaller drum to rotate and wind up the cable attached to said trailer so as to draw the trailer toward the tractor, the difference in the diameters of said drums causing a multiplication of the amount of power applied to draw up said trailer as compared with the power applied to said driving winch.

12. A train including a tractor and at least one trailer arranged to be coupled thereto, a driving winch on said tractor, a relay-winch having drums of different diameters, said drums being normally coupled to rotate together, a first cable attached to said trailer and arranged to be wound upon a first one of said drums of said relay-winch, a second cable adapted to be wound upon said driving winch and upon a second drum of said relay-winch having a different diameter from said first drum to effect a power translation when the drums are coupled to each other, and means to uncouple the drums of said relay-winch to permit said first and second cables to be wound upon or unwound from said first and second drums respectively and independently of each other.

13. A train including a tractor and a plurality of trailers arranged to be coupled together, a driving winch on said tractor, a relay-winch having drums of different diameters upon a first one of said trailers, said drums being normally coupled to rotate together, a first cable attached to a second of said trailers and arranged to be wound upon a first one of said drums, and a second cable adapted to be wound upon said driving winch and upon a second relay-winch drum of different diameter, whereby when the driving winch is released and said second trailer is uncoupled, said first cable will be unwound from said first drum as the tractor and said first trailer move forward, thereby causing said second cable to be unwound from said driving winch and wound upon said second drum so as to permit said second trailer to stand still while the tractor and said first trailer advance.

14. A train including a tractor and a plurality of trailers arranged to be coupled together, a driving winch on said tractor, a relay-winch having drums of different diameters upon a first one of said trailers, said drums being normally coupled to rotate together, a first cable attached to a second of said trailers and arranged to be wound upon a first one of said drums, and a second cable adapted to be wound upon said driving winch and upon a second relay-winch drum of different diameter, whereby when the driving winch is released and said second trailer is uncoupled said first cable will be unwound from said first drum as the tractor and said first trailer move forward, thereby causing said second cable to be unwound from said driving winch and wound upon said second drum so as to permit said second trailer to stand still while the tractor and said first trailer advance, and whereby when power is applied to the driving drum it will wind upon itself cable unwound from said second drum, said unwinding operation causing said first drum to rotate and wind up the cable attached to said second trailer so as to draw said trailer toward said first trailer, the difference in the diameters of said drums causing a change in the amount of power applied to draw up said trailer as compared with the power applied to said driving winch.

15. A train including a tractor and a plurality of trailers arranged to be coupled together, a driving winch on said tractor, a relay-winch having drums of different diameters upon a first one of said trailers, said drums being normally coupled to rotate together, a first cable attached to a second of said trailers and arranged to be wound upon a first one of said drums of smaller diameter, and a second cable adapted to be wound upon said driving winch and upon a second relay-winch drum of larger diameter, whereby when the driving winch is released and said second trailer is uncoupled said first cable will be unwound from said smaller drum as the tractor and said first trailer move forward, thereby causing said second cable to be unwound from said driving winch and wound upon said larger drum so as to permit said second trailer to stand still while the tractor and said first trailer advance, and whereby when power is applied to the driving winch it will wind upon itself cable unwound from said larger drum, said winding operation causing said smaller drum to rotate and wind up the cable attached to said second trailer so as to draw said second trailer toward said first tractor, the difference in the diameters of said drums causing a multiplication of the amount of power applied to draw up said second trailer as compared with the power applied to said driving winch.

16. A train including a tractor and a plurality of trailers arranged to be coupled together, a driving winch on said tractor, a relay-winch having drums of different diameters upon a first one of said trailers, said drums being normally coupled to rotate together, a first cable attached to a second of said trailers and arranged to be wound upon a first one of said drums of said relay-winch, a second cable adapted to be wound upon said driving winch and upon a second drum of said relay-winch having a different diameter from said first drum to effect a power translation when the drums are coupled to each other, and means to uncouple the drums of said relay-winch to permit said first and second cables to be wound upon or unwound from said first and second drums respectively and independently of each other.

17. A train including a tractor and at least one trailer arranged to be coupled thereto, a driving winch on said tractor, a relay-winch having drums of different diameters arranged to rotate together about a common axis, a first cable attached to said trailer and arranged to be wound upon a first one of said drums, a second cable adapted to be wound upon said driving winch and upon a second relay-winch drum of a different diameter, a locking element for said relay-winch permitting the drums thereof to rotate in such direction as to wind said first cable upon said first drum and unwind said second cable from said second drum but normally preventing rotation in the opposite direction, whereby when said locking element and said driving winch are released and said trailer is uncoupled said first cable will be unwound from said first drum as the tractor moves forward, thereby causing said second cable to be unwound from said driving winch and wound upon said second drum so as to permit the trailer to stand still while the tractor advances.

18. A train including a tractor and at least one trailer arranged to be coupled thereto, a driving winch on said tractor, a relay-winch having drums of different diameters arranged to rotate together about a common axis, a first cable attached to said trailer and arranged to be wound upon a first one of said drums of smaller diameter, a second cable adapted to be wound upon said driving winch and upon a second relay-winch drum of a larger diameter, a locking element for said relay-winch permitting the drums thereof to rotate in such direction as to wind said first cable upon said first drum and unwind said second cable from said second drum, but normally preventing rotation in the opposite direction, whereby when said locking element and said driving winch are released and said trailer is uncoupled said first cable will be unwound from said first drum as the tractor moves forward, thereby causing said second cable to be unwound from said driving winch and wound upon said second drum so as to permit the trailer to stand still while the tractor advances and whereby, whether said locking element is released or not, when power is applied to said driving winch it will wind upon itself cable unwound from said larger drum, said unwinding operation causing said smaller drum to rotate and wind up the cable attached to said trailer so as to draw the trailer toward the tractor, the difference in the diameters of said drums causing a multiplication of the amount of power applied to draw up said trailer as compared with the power applied to said driving winch.

19. A train including a tractor and a plurality of trailers arranged to be coupled together, a driving winch on said tractor, a relay-winch upon a first one of said trailers said relay-winch having drums of different diameters arranged to rotate together about a common axis, a first cable attached to a second of said trailers and arranged to be wound upon a first one of said drums, a second cable adapted to be wound upon said driving winch and upon a second relay-winch drum of different diameter, a locking arrangement for said relay-winch permitting the drums thereof to rotate in such direction as to wind said first cable upon said first drum and unwind said second cable from said second drum but normally preventing rotation in the opposite direction, whereby when said locking element and said driving winch are released and said second trailer is uncoupled said first cable will be unwound from said first drum as the tractor moves forward, thereby causing said second cable to unwind from said driving winch and wound upon said second drum so as to permit said second trailer to stand still while the tractor and said first trailer advance.

20. A train including a tractor and a plurality of trailers arranged to be coupled together a driving winch on said tractor, a relay-winch upon a first one of said trailers, said relay-winch having drums of different diameters arranged to rotate together about a common axis, a first cable attached to a second of said trailers and arranged to be wound upon a smaller one of said drums, a second cable adapted to be wound upon said driving winch and upon a second relay-winch drum of larger diameter, a locking arrangement for said relay-winch permitting the drums thereof to rotate in such direction as to wind said first cable upon said smaller drum and unwind said second cable from said larger drum but normally preventing rotation in the opposite direction whereby when said locking element and said driving winch are released and said second trailer is uncoupled said first cable will be unwound from said smaller drum as the tractor moves forward, thereby causing said second cable to be unwound from said driving winch and wound upon said larger drum so as to permit said second trailer to stand still while the tractor and said first trailer advance, and whereby whether said locking element is released or not, when power is applied to said driving winch it will wind upon itself cable unwound from said larger drum, said unwinding operation causing said smaller drum to rotate and wind up the cable attached to said trailer so as to draw the trailer toward the tractor, the different in the diameters of said drums causing a multiplication of the amount of power applied to draw up said trailer as compared with the power applied to said driving winch.

TEMPLE C. SMITH.
ALBERT E. FREEMAN.